(12) United States Patent
Grichnik

(10) Patent No.: US 6,256,619 B1
(45) Date of Patent: Jul. 3, 2001

(54) SELF OPTIMIZING NEURAL NETWORK ANALOG DATA PROCESSING SYSTEM

(75) Inventor: Anthony J. Grichnik, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 08/996,502

(22) Filed: Dec. 23, 1997

(51) Int. Cl.[7] .............. G06F 15/18; G06E 3/00
(52) U.S. Cl. .............. 706/19; 706/20; 706/13; 706/15; 706/16; 706/27
(58) Field of Search ............. 706/19, 20, 13, 706/15, 16, 27

(56) References Cited

U.S. PATENT DOCUMENTS

| | | | | |
|---|---|---|---|---|
| 5,058,180 | * | 10/1991 | Khan | 706/20 |
| 5,249,259 | * | 9/1993 | Harvey | 706/13 |
| 5,546,505 | * | 8/1996 | Austvold et al. | 706/15 |
| 5,761,381 | * | 6/1998 | Arci et al. | 706/13 |
| 5,781,698 | * | 7/1998 | Teller et al. | 706/13 |
| 5,854,993 | * | 12/1998 | Grichnik | 706/20 |

OTHER PUBLICATIONS

Chapter 1, "A Gentle Introduction to Genetic Algorithms," David E. Goldberg, Reprinted w/corrections Jan., 1989.

* cited by examiner

Primary Examiner—George B. Davis
(74) Attorney, Agent, or Firm—Alvin J. Riddles; Steven G. Kibby

(57) ABSTRACT

A analog data neural network processing system is provided in which there is a self optimization capability that varies the signal processing factors in response to a detected contrast in the system output patterns. The system provides feedback type guidance in varying such processing factors as sampling rate, frame length, signal transformation, neural network vigilance and architecture, each in a direction that will maximize or minimize the contracts with patterns used to train the network. The processing system is useful in all signal classification tasks.

16 Claims, 3 Drawing Sheets

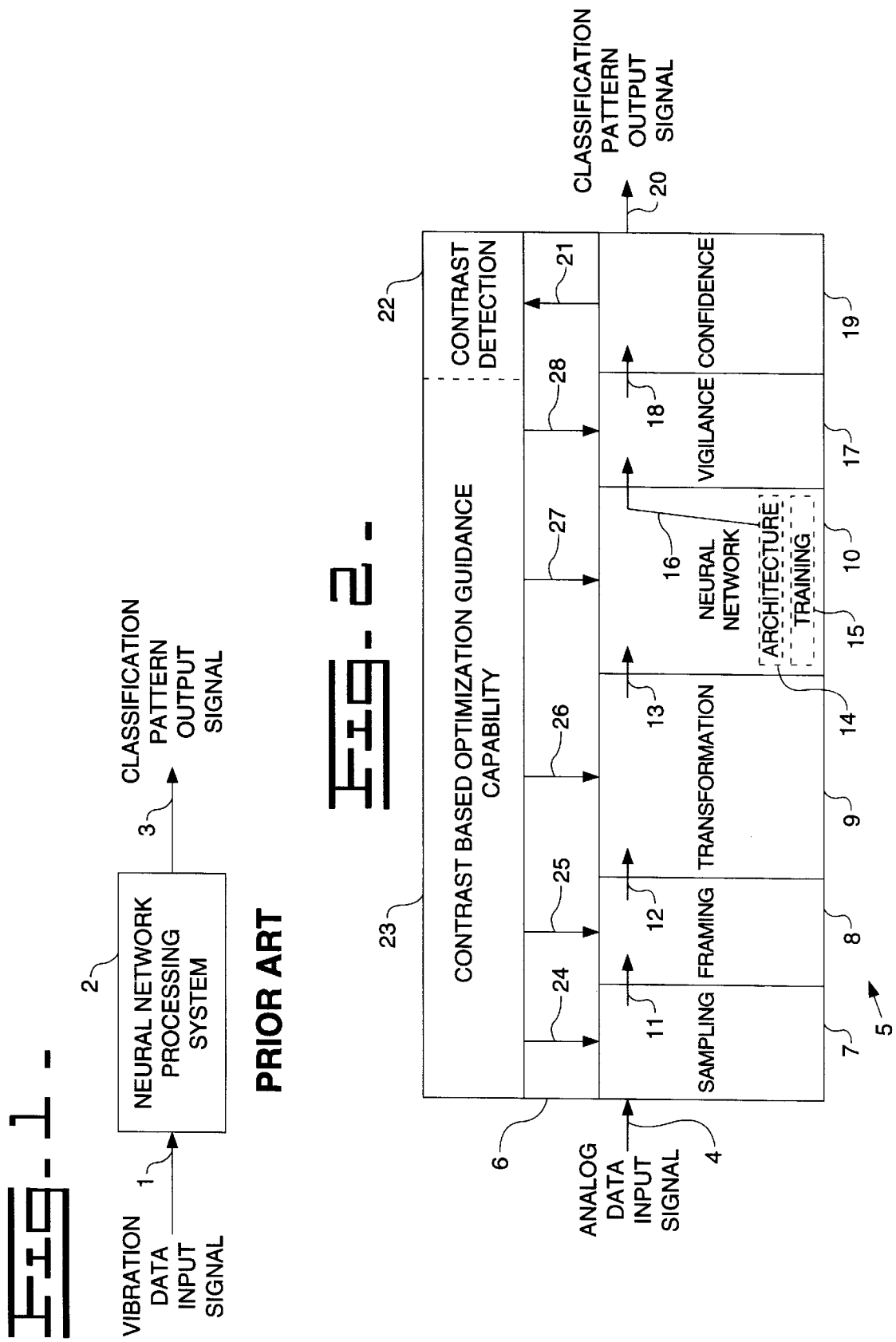

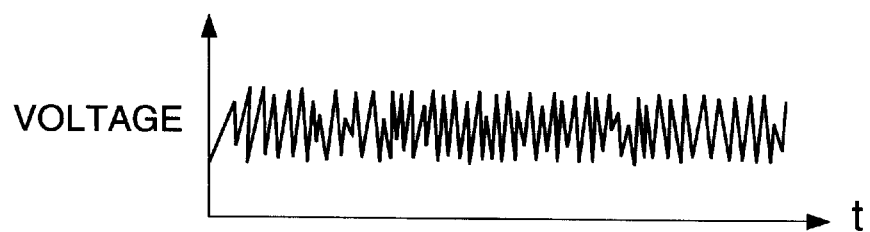
Fig-3a-
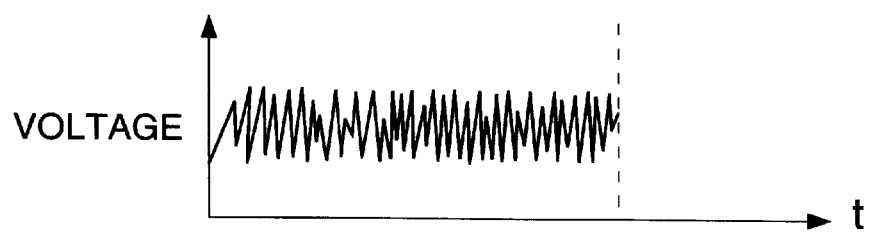
Fig-3b-
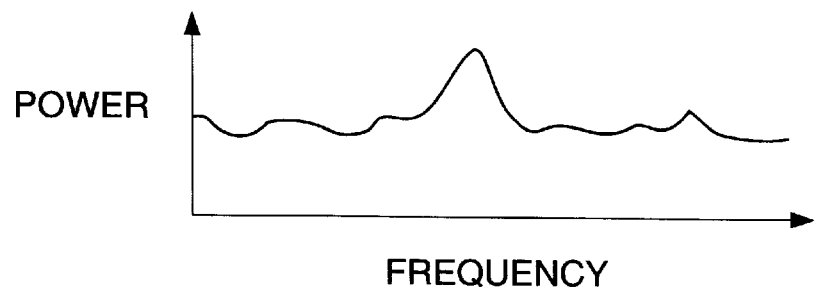
Fig-3c-

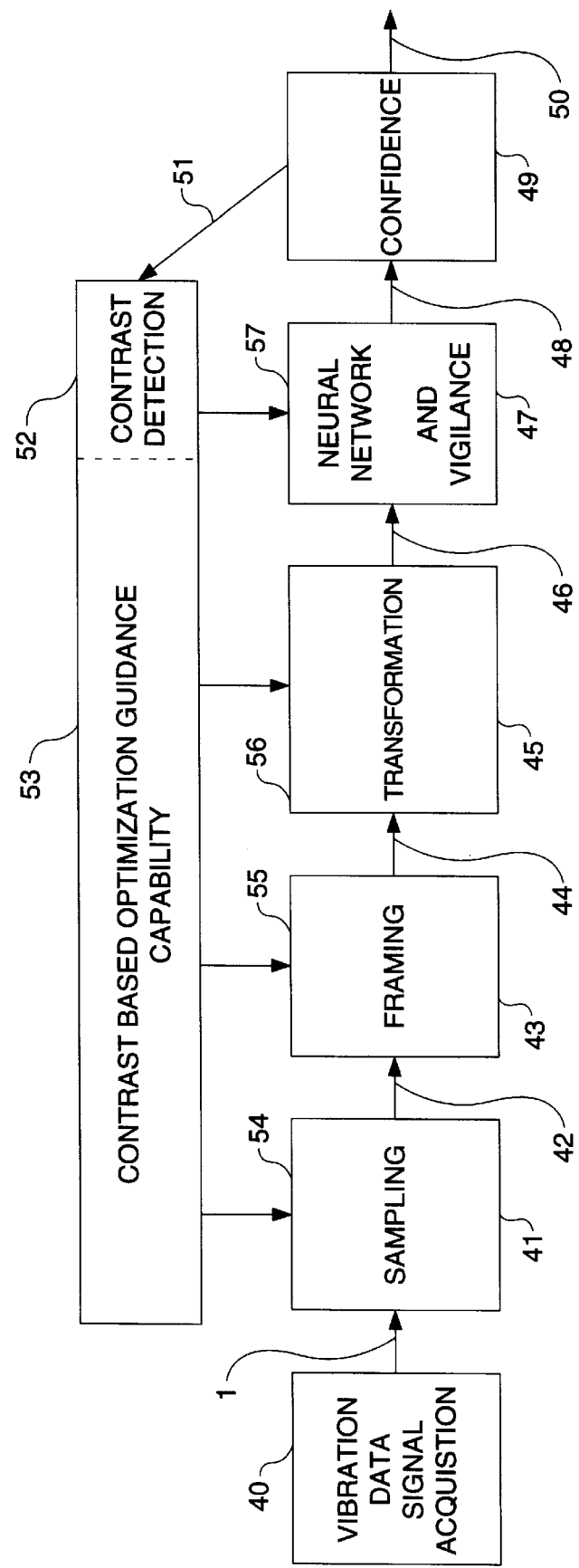

SELF OPTIMIZING NEURAL NETWORK ANALOG DATA PROCESSING SYSTEM

CROSS REFERENCE TO RELATED APPLICATIONS

The invention developed out of a continuing effort involving machine performance analysis via a neural network including the following U.S. Pat. Nos. 5,602,761; 5,566,092; 5,566,273; and 5,854,993.

TECHNICAL FIELD

The invention relates to the processing of analog signal data for the diagnosis, evaluation and classification of the performance of a machine in which the processing involves a neural network, and in which the processing system parameters undergo an optimization evolution as the data is being processed.

BACKGROUND ART

Vibration Data Neural network signal analysis, with some signal processing modification, has been employed in the art to identify and to diagnose problems in machinery and in products being manufactured.

As an example, in U.S. Pat. No. 5,361,628 diagnostic testing and classification of automobile engines is described, in which, in connection with a neural network, subsampling and filtration for reduction of a vibration signal band is used in order not to overload the neural network.

In general, heretofore in the art problem identification and diagnostic systems involving a neural network are set up and optimized under static conditions using known parameters. There are however, conditions that may evolve in operation, such as changes in the material being processed, changes in one or more of the sensed parameters such as rotation rate, and progressive changes such as the increasing effect of bearing deterioration, that can cause an overall system to perform less than optimally with an attendant reduction in accuracy and responsiveness.

DISCLOSURE OF THE INVENTION

A machine performance analog data processing system involving a neural network is provided in which there is a self optimization capability that varies the signal processing factors in the system of the invention in response to a detected contrast in the classification patterns produced by the system.

The system responds to contrasting conditions and provides feedback type guidance in varying such processing factors as sampling rate, frame length, signal transformation, neural network vigilance and architecture, each in a direction that will maximize the overall performance.

The system of the invention can be applied to machine performance signal classification tasks associated with the analysis and control of mechanical systems, such as vibration data processing and sound field processing.

BRIEF DESCRIPTION OF THE DRAWINGS

FIG. 1 is a block diagram of a prior art type of neural network processing system for vibration data.

FIG. 2 is a block diagram of the elements and features of the self optimizing system of the invention.

FIGS. 3A, 3B and 3C are depictions of the sampling, framing and signal transformation influencing factors of machine performance in analog data signals.

FIG. 4 is a block diagram of the elements and features in an embodiment of the invention.

BEST MODE FOR CARRYING OUT THE INVENTION

One application of the invention is in vibration data type of processing. In vibration data neural network data processing systems, the vibration data input signal is taken at a location through sensors and is delivered as an analog signal to a neural network processing arrangement. The signal will be modified for compatibility with a neural network that, by virtue of architecture and pattern recognition training, can classify patterns in the signals being processed and deliver generic classification signal patterns that can be associated with physical events.

The classification signals generally indicate acceptable operation, or that there are patterns present that sufficiently resemble patterns that have been previously identified with problems, indicating attention to the situation at hand is required.

Referring to FIG. 1 there is shown an illustrative block diagram of the type of system existing in the art. In FIG. 1 a band of vibration data signals are collected in connection with machinery (not shown) and delivered through input channel 1 to a neural network processing system 2 wherein the vibration data signals are processed to minimize extraneous computation and to make them compatible with the neural network. The sensitivity or vigilance of the neural network is arranged to provide an output signal at channel 3 that is a classification of a system condition.

Systems of the type of FIG. 1 have several limitations. One major limitation is that there are many elements in the processing that can influence overall performance, the effects of which must be anticipated in the initial setting up of the system. Such a situation in turn requires persons with high skill in setting the system up and an inability in the system to accommodate evolutionary changes as the system is used. Another limitation is that as a system of the type in FIG. 1 is in use, variations may appear in the performance of individual component parts which may affect the overall system performance.

In accordance with the invention a self optimizing processing system for analog data of machine performance is provided that varies the signal processing elements of the system by providing guidance to those elements of the processing system in the direction of maximizing the contribution of and compensating for changes at each element and thereby enhancing and extending the overall system performance.

In FIG. 2 there is shown a block diagram of the elements and features of the self optimizing system of the invention and in FIGS. 3A, 3B and 3C there are shown a depictions of sampling, framing and transformation types of influencing factors.

Referring to FIGS. 2, and 3A, 3B and 3C; in FIG. 2 the analog data input signal 4 is delivered to an input signal processing section 5 of the self optimizing processing system 6.

In accordance with the invention the input signal of analog data contains more information than the processing systems heretofore in the art could accommodate, so that there is susceptibility in this data processing system for signal conditioning that will focus guidance on aspects of the signal which would render a neural network processing system more accurate and flexible in classifying those input signals.

The input signal processing section 5 has a separately variable element for each overall system performance affecting point in the processing of the analog signal, of which three are shown for explanation purposes, illustrated as elements 7,8 and 9.

Each of elements 7,8 and 9 is directed to a different aspect of the analog input signal, that when varied can produce an effect on the output of the system 6. The element 7 involves high frequency digital sampling and is labeled "sampling" in FIG. 2 and in FIG. 3A, the element 8 is directed to selecting the number of samples in a given time length of the signal being processed and is labeled "framing" in FIG. 2 and in FIG. 3B, and the element 9 is directed to the arrangement of the signal into an optimal form compatible with the responsiveness of the type of neural network processing being used, and is labeled "transformation: in FIG. 2 and in FIG. 3C. There are many types of transformation techniques in use singly and in combination in the art, of which the Autoregression and the Fast Fourier Transform are examples. The output of each of the elements 7,8,and 9 progresses serially and is delivered as the input signal to a neural network element 10 as indicated by the inter element signal communication channels depicted as arrows 11,12 and 13 respectively. The neural network 10 has an architectural arrangement 14 involving conventional summing elements and interconnections, and a training mechanism 15 which trains the neural network to recognize particular patterns. The signals at the nodes of the output layer of summing elements of the architectural arrangement 14 are delivered through a communication channel depicted as arrow 16 to a vigilance section 17 of the neural network 10 in which there is made a determination of whether any node in the output layer of summing elements of the neural network architecture exceeds a variable minimum confidence level.

The output pattern from the vigilance section 17 is delivered through a communication channel depicted as arrow 18 to a confidence section 19 wherein a comparison occurs that establishes whether any node signal on channel 18 exceeds a user selected confidence level value. Where that confidence level value is met or exceeded, the classification pattern output is delivered as an output on channel 20. Where the confidence level values are less than the user selected confidence level, the highest value is delivered on channel 21 to a contrast detection section 22 located in a contrast based optimization guidance capability element 23.

The contrast based optimization guidance capability element 19 provides signals to each of the elements in the system 6 that can affect the overall output of the system 6 so as to thereby control the relationship of the actual output confidence level to that of the user selected confidence level. The guidance delivered on channels 24 to 28 is different for each of the performance influencing elements.

The guidance delivered via channel 27 to the neural network element 10 may actuate a standard in the art pattern training capability 15 or architectural configuration modification capability 14 in response to a high contrast value indicating an input signal is significantly different than all previously trained patterns.

One significant advantage of the present invention is to adaptively condition an input signal to contrast with all previously trained patterns, and thereby avoid network fragmentation caused by insufficient differences in training patterns.

The guidance delivered to the vigilance section 17 via channel 28 operates to determine the minimum confidence level on channel 16 will be accepted. Where the running time to an acceptable match is inordinately long the vigilance guidance signal on channel 28 may reduce the requirement in order to avoid recognition failure.

The element 23 operates to vary the difference between the confidence value on the highest node in the output pattern and the "set in" user selected confidence value. That difference will be referred to in subsequent discussion as a "contrast value" or may be considered to be a "goal function value".

The contrast value or goal function value is then used in element 23 in a genetic algorithm that, based on the contrast value, provides guidance signals to some or all of the elements 7,8,9,10, and 17 on separate communication channels depicted as arrows 24 to 28 respectively.

The genetic algorithm operates by assembling in tabular form "seed" combinations of parameter values within the controllable range of each of elements 7–10 and 17, and then processing the input data using each combination. Combinations increasing or decreasing the contrast value or goal function value produced are identified, incrementally altered ("mutated"), and crossed with one another, then applied to the elements 7–10 and 17 in an iterative process until the contrast reaches a desired minimum or maximum value depending upon the mode of operation. The optimization capability is known as a genetic algorithm because it retains only those combinations "fit" to survive and mutate by virtue of driving the goal function in the proper direction.

The genetic algorithm, in response to the contrast value or goal function value and the mode of operation, delivers different guidance on channels 24 to 28 that modifies the effect of each system performance influencing element within it's respective operating range.

There are two principle modes of operation, a diagnostic mode and a training mode which require the goal function or contrast be driven in opposite directions. In the diagnostic mode, it is desirable to minimize the contrast by conditioning the data input signal to most closely resemble one of the training patterns and consequently classify the pattern with high confidence. In the training mode, the object is being taught to recognize new patterns using the training 15 to adjust the architecture 14 of the neural network, after first conditioning the signal to maximize the contrast value or goal function value so as to produce output patterns that have low confidence values, which causes the input data to appear unlike any other previously trained data. An inability to reach a selected contrast value in an acceptable time indicates a previously undiagnosed failure calling for further training.

In operation the system of the invention self optimizes the setting of each element that influences overall operation, thereby permitting set up without highly skilled technicians, prolonging system lifetime, increasing tolerance of component variations and enhancing reliability. The system of the invention is particularly useful in preventing a problem in the art called network fragmentation where training is lost and recognition fails when attempting to recognize closely similar input patterns.

It will be apparent that within the principle of the invention that there will be considerable variations in implementation configurations. The goal of the invention is to provide a contrast driven feedback that adjusts the individual components of the system into a more optimal overall performance. The contrast value indication can be directly measured as illustrated or built into the individual overall performance influencing components. Similarly, the adjustment signals can be separate incrementing or decrementing signals or genetic algorithm functions (as illustrated). Self adjustment of groups of components such as the input data signal processing components 7,8 and 9 can be done independently of the neural network related components.

INDUSTRIAL APPLICABILITY

In FIG. 4 an illustration is provided of a serial implementation of the principle of the invention as applied to machine performance involving vibration data. Referring to FIG. 4 the vibration data input signal band 1 is acquired in element 40 using standard transducers and accelerometers such as the 328CO4PCB type used in the art, applied to rotating fabrication machinery, which signals in turn are processed in a DT2821-G-8DI acquisition board for a standard personal computer. The transducers and accelerometers may measure vibration, sound, force and pressure and such other criteria as temperature and lubricant oil condition.

The sampling operation is labeled element 41. The element 41 can be constructed using an analog to digital converter that is provided with a variable frequency in a range from 10 Hz to 10 G Hz. The sampling output is delivered on the channel labeled 42 to the framing operation labeled element 43. The framing operation selects how many successive sampled signals will be used. The range from 512 to 2048 samples are used in this example. The framing operation data signal is delivered to the transformation element 45 on channel 44. The signal transformation operation highlights the significant features of the signal. The autoregression technique used in the art is employed within the range of 10 and 50. The fast fourier transform technique may also be used in when adjusted in the range of between 16 and 8192 lines of resolution.

The sampled, framed and transformed data signal is then delivered on channel 46 to the neural network and vigilance element 47. In this illustration the vigilance aspect of the neural network is operable within the range of 0.3 to 0.9. The neural network output pattern is delivered on channel 48 to a confidence element 49 in which a user selected confidence value of 0.95 is preferably "set in."

When the pattern received on channel 48 has a node value which meets or exceeds the 0.95 confidence value requirement it is transmitted on the output 50 of confidence comparator 49. When the pattern received on the channel 48 is less than the 0.95 criterion, signals are delivered on channel 51 indicating the fact that the "set in" value has not been met and the highest confidence value associated with the pattern received on channel 48. In this example consider 0.7 as the highest confidence value.

The signals on channel 51 are delivered to a contrast detector labeled element 52 located in a contrast based optimization guidance capability labeled element 53. The contrast detection element 52 in response to the signals received from the confidence element provides a contrast value for use in the element 53. In the example at hand, that contrast value is the difference between a desired confidence value and the actual confidence value, which is 0.25 (0.95–0.7). Determination of the contrast value may alternatively occur in confidence comparator 49.

The contrast based optimization guidance capability element provides signals to adjust the parameters for each of the elements 41, 43, 45 and 47 on channels 54,55,56 and 57 respectively in accordance with an effect to maximize or minimize the contrast value using a genetic algorithm as previously set forth.

What has been described is a self optimizing neural network analog data processing system where a contrast driven feedback adjusts the individual components of the system into a more optimal overall performance.

What is claimed is:

1. A neural network signal classifier system, wherein an analog data signal input is processed in multiple stages before being provided to a neural network, the system comprising in combination:

a separate adjustable element for each signal processing stage of said multiple stages for influencing overall performance of the classifier system;

means for recognizing an output pattern contrast with a preset desired confidence; and, an optimization guidance capability having means for delivering a guidance adjustment signal to each said signal processing stage, said adjustment signal being responsive to said output pattern contrast.

2. The system of claim 1, wherein said separate adjustable element for each signal processing stage of said multiple stages is at least one of an input signal sampling, an input signal framing, and an input signal transformation element.

3. The processing system of claim 2, wherein said sampling is adjusted in the frequency range of 10 Hz–10 GHz; said framing is adjusted in the range of 512–2048 samples; said transformation is at least one of, an autoregression adjusted in the order range of 10–50, and a fast fourier transform adjusted in the range of 16–8192 lines of resolution.

4. Apparatus for self optimizing overall performance of a neural network analog data processing system wherein a data input signal is processed in a neural network to identify signal patterns in said data input signal, said system comprising in combination:

an input signal processing stage having in a serial arrangement an input data signal sampling element and a conversion element;

a neural network processing stage having means for neural network processing of a data signal from said input signal processing stage and applying a vigilance factor to produce an output signal pattern;

a contrast detection stage for providing a contrast signal representing a difference between a user selected confidence value and a confidence value of said output signal pattern; and a contrast based optimization guidance capability stage having means for receiving said contrast signal and responsively providing a guidance signal to at least one of said input signal processing stage elements, and said neural network.

5. The apparatus of claim 4, wherein said contrast based optimization guidance capability stage includes a genetic algorithm that iteratively generates a plurality of guidance signals to drive said contrast signal in a desired direction.

6. The apparatus of claim 5 wherein said genetic algorithm operates to maximize the contrast prior to training the neural network with a new input data signal pattern.

7. The apparatus of claim 4, wherein said input signal processing stage includes serially arranged separate elements for sampling, framing and transformation.

8. The apparatus of claim 7, wherein said transformation element performs at least one of autoregression and fast fourier transformations.

9. The apparatus of claim 8, wherein said sampling is adjusted in the frequency range 10 Hz–10 GHz; said framing is adjusted in the range of 512–2048 samples; said transformation is at least one of autoregression adjusted in the order range of 10–50, and fast fourier transform adjusted in the range of 16–8192 lines of resolution, and, said vigilance factor is adjusted in the range of 0.3–0.9.

10. A method of self optimization processing of machine performance analog signals, comprising in combination the steps of:

provining guidance signal responsive signal processing elements to condition the signals;

supplying the conditioned signals to a neural network to generate output patterns;

comparing a user selected confidence value and the output patterns of said neural network to provide a contrast signal representing the difference therebetween; and providing contrast based optimization guidance responsive to said contrast signal for providing a guidance signal to each said signal processing element, said guidance signal delivering an adjustment signal to each said processing element.

11. The method of claim 10, wherein said contrast based optimization guidance drives said contrast signal to one of a maximum and a minimum contrast value range.

12. The method of claim 11, wherein said guidance drives said contrast signal to the maximum range when training the neural network.

13. The method of claim 11, wherein said guidance drives said contrast signal to the minimum range when procession the analog signals to diagnose machine performance.

14. The method of claim 10, wherein the step of providing guidance signal responsive elements comprises providing input signal sampling, input signal framing, and input signal transformation elements.

15. The method of claim 14, wherein said sampling is adjusted in the frequency range of 10 Hz–10 GHz; said framing is adjusted in the range of 512–2048 samples; said transformation is at least one of an autoregression adjusted in the order range of 10–50, and a fast fourier transform adjusted in the range of 16–8192 lines of resolution, and, said vigilance factor is adjusted in the range of 0.3–0.9.

16. The method of claim 10, wherein the step of providing guidance signal responsive elements comprises providing one of autoregression and fast fourier transformation elements, the order of said transformation being determined by said guidance signal.

* * * * *